US012693892B2

(12) United States Patent
Hamlin et al.

(10) Patent No.: US 12,693,892 B2
(45) Date of Patent: Jul. 28, 2026

(54) PLATFORM FRAMEWORK COMMUNICATIONS

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 833 days.

(21) Appl. No.: 17/355,346

(22) Filed: Jun. 23, 2021

(65) Prior Publication Data

US 2022/0417285 A1     Dec. 29, 2022

(51) Int. Cl.
G06F 9/48        (2006.01)
G06F 9/54        (2006.01)

(52) U.S. Cl.
CPC ............ G06F 9/4856 (2013.01); G06F 9/542 (2013.01)

(58) Field of Classification Search
CPC ..... G06F 9/4856; G06F 9/542; H04L 63/126; H04L 9/40; H04N 23/60
See application file for complete search history.

(56) References Cited

U.S. PATENT DOCUMENTS 8,248,992 B2 * 8/2012 Kim .................... H04L 12/2818
                                                     370/328
2006/0129513 A1 * 6/2006 Nakatani ............... G06F 3/0647

2006/0212574 A1 * 9/2006 Maes .................... H04L 63/102
                                                     709/226
2014/0236812 A1 * 8/2014 Capuozzo .......... G06Q 20/3255
                                                     705/39
2014/0298401 A1 * 10/2014 Batson .................... H04L 63/20
                                                     726/1
2014/0372375 A1 * 12/2014 Desai .................... G06F 16/176
                                                     707/624
2016/0037055 A1 * 2/2016 Waddington ........... H04N 23/62
                                                     348/211.8
2018/0013696 A1 * 1/2018 Nedeltchev .......... H04L 47/822
                                     (Continued)

OTHER PUBLICATIONS

Lee et al. "Enabling Smart Spaces with OSGi", IEEE Pervasive computing, 2(3), pp. 89-94 (Year: 2003).*

*Primary Examiner* — Bradley A Teets
*Assistant Examiner* — Willy W Huaracha
(74) *Attorney, Agent, or Firm* — Fogarty LLP

(57) ABSTRACT

Embodiments of systems and methods for platform framework communications are described. Participants of a platform framework are registered as providing operation of a plurality of hardware devices of an Information Handling System (IHS). A registration request is received, by the platform framework, from a participant providing operation of a hardware device, where the request specifies a handle for communicating with the participant in order to operate the hardware device. The handle for communicating with the participant in operation of the hardware device is provided to a second participant that has registered with the platform framework and registered as a user of the hardware device. An update to the handle used for communicating with the first participant is determined. The second participant is notified of the updated handle for communicating with the first registered participant in operation of the first hardware device.

15 Claims, 4 Drawing Sheets

(56)  References Cited

U.S. PATENT DOCUMENTS

| | | | |
|---|---|---|---|
| 2018/0191697 A1* | 7/2018 | Ghafourifar | ............ H04L 63/10 |
| 2020/0097961 A1* | 3/2020 | Luo | ...................... G06Q 20/123 |
| 2021/0051002 A1* | 2/2021 | Cheng | ..................... H04L 9/088 |
| 2021/0194715 A1* | 6/2021 | Ansari | ................... H04L 63/20 |
| 2022/0103520 A1* | 3/2022 | Chifor | ................. H04L 63/0236 |
| 2022/0286388 A1* | 9/2022 | Mermoud | .............. H04L 45/28 |
| 2023/0114326 A1* | 4/2023 | Bai | ....................... G06F 3/0647 |
| | | | 707/609 |

* cited by examiner

PLATFORM FRAMEWORK COMMUNICATIONS

FIELD

The present disclosure relates generally to Information Handling Systems (IHSs), and more particularly, to systems and methods for supporting the use of various internal components of IHSs.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework communications are described. In an illustrative, non-limiting embodiment, an Information Handling System (IHS) may include a plurality of hardware devices, each operated by one or more registered participants of a platform framework. The IHS embodiments may also include processor and a memory coupled to the processor, the memory having program instructions stored thereon that, upon execution, cause the platform framework to: receive a registration request from a first of the registered participants providing operation of a first of the plurality of hardware devices, wherein the request specifies a handle for communicating with the first participant in order to operate the first hardware device; provide the handle for communicating with the first registered participant in operation of the first hardware device to a second participant that has registered with the platform framework and registered as a user of the first hardware device; determine an update to the handle used for communicating with the first registered participant in operation of the first hardware device; and notify the second participant of the updated handle for communicating with the first registered participant in operation of the first hardware device.

In additional IHS embodiments, the first registered participant provides operation of the first hardware device by interfacing with at least one of a driver and firmware used to operate the first hardware device. In additional IHS embodiments, the handle is provided along with a token corresponding to a signature of the at least one of the driver and firmware used to operate the first hardware device. In additional IHS embodiments, upon providing the handle to the second participant, the second participant authenticates the token as having been signed by a trusted resource of the IHS. In additional IHS embodiments, the trusted resource of the IHS signs the token upon validation that a signature calculated based on instructions in use by the at least one of the driver and firmware matches the signature of the token. In additional IHS embodiments, the executed instructions further cause the platform framework to determine whether the operation of the first hardware device by the first registered participant corresponds to operation of a kernel resource of the IHS, and wherein the executed instructions further cause the platform framework to generate a virtual platform framework participant that interfaces with the first participant in providing operation of the kernel resource. In additional IHS embodiments, the executed instructions further cause the platform framework to generate a handle for communicating with the virtual participant and to provide the second participant with the handle to the virtual participant instead of providing the handle for communicating with the first participant that provides operation of the kernel resource. In additional IHS embodiments, the update to the handle is determined in response to a plurality of errors detected by the platform framework. In additional IHS embodiments, the second participant comprises a containerized workspace and wherein the update to the handle is determined in response to migration of the containerized workspace from operation on the IHS to operation on a remote resource. In additional IHS embodiments, the handle supports an API (Application Programming Interface) specifying notifications that are generated by the first hardware device. In additional IHS embodiments, the API supported by the handle further specifies operations of the first hardware device that are supported by the first participant. In additional IHS embodiments, the notifications specified by the API supported by the handle comprise user presence detection notifications. In additional IHS embodiments, the notifications specified by the API supported by the handle comprise notifications of a change in a physical posture of the IHS. In additional IHS embodiments, the operations specified by the API supported by the handle comprise operations for capturing images using a camera of the IHS. In additional IHS embodiments, the API supported by the handle further specifies operations for notifying the first participant of policy changes related to the first hardware device. In additional IHS embodiments, the first hardware device comprises a display of the IHS, and wherein the policy changes comprise changes to a display policy for initiating privacy capabilities supported by the display.

In various additional embodiments, memory storage devices include program instructions stored thereon that, upon execution by an Information Handling System (IHS) comprising a plurality of hardware devices, each operated by one or more registered participants of a platform framework, cause the IHS to: receive a registration request from a first of the registered participants providing operation of a first of the plurality of hardware devices, wherein the request specifies a handle for communicating with the first participant in order to operate the first hardware device; provide the handle for communicating with the first registered participant in operation of the first hardware device to a second participant that has registered with the platform framework and registered as a user of the first hardware device; determine an update to the handle used for communicating with the first registered participant in operation of the first hardware device; and notify the second participant of the updated handle for communicating with the first registered participant in operation of the first hardware device. In additional memory storage device embodiments, the first registered participant provides operation of the first hardware device by interfacing with at least one of a driver and firmware used to operate the first hardware device.

A various additional embodiments, methods may include: registering one or more participants of a platform framework as providing operation of a plurality of hardware devices of an Information Handling System (IHS); receiving a registration request from a first of the registered participants providing operation of a first of the plurality of hardware devices, wherein the request specifies a handle for communicating with the first participant in order to operate the first hardware device; providing the handle for communicating with the first registered participant in operation of the first hardware device to a second participant that has registered with the platform framework and registered as a user of the first hardware device; determining an update to the handle used for communicating with the first registered participant in operation of the first hardware device; and notifying the second participant of the updated handle for communicating with the first registered participant in operation of the first hardware device. In additional method embodiments, the first registered participant provides operation of the first hardware device by interfacing with at least one of a driver and firmware used to operate the first hardware device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
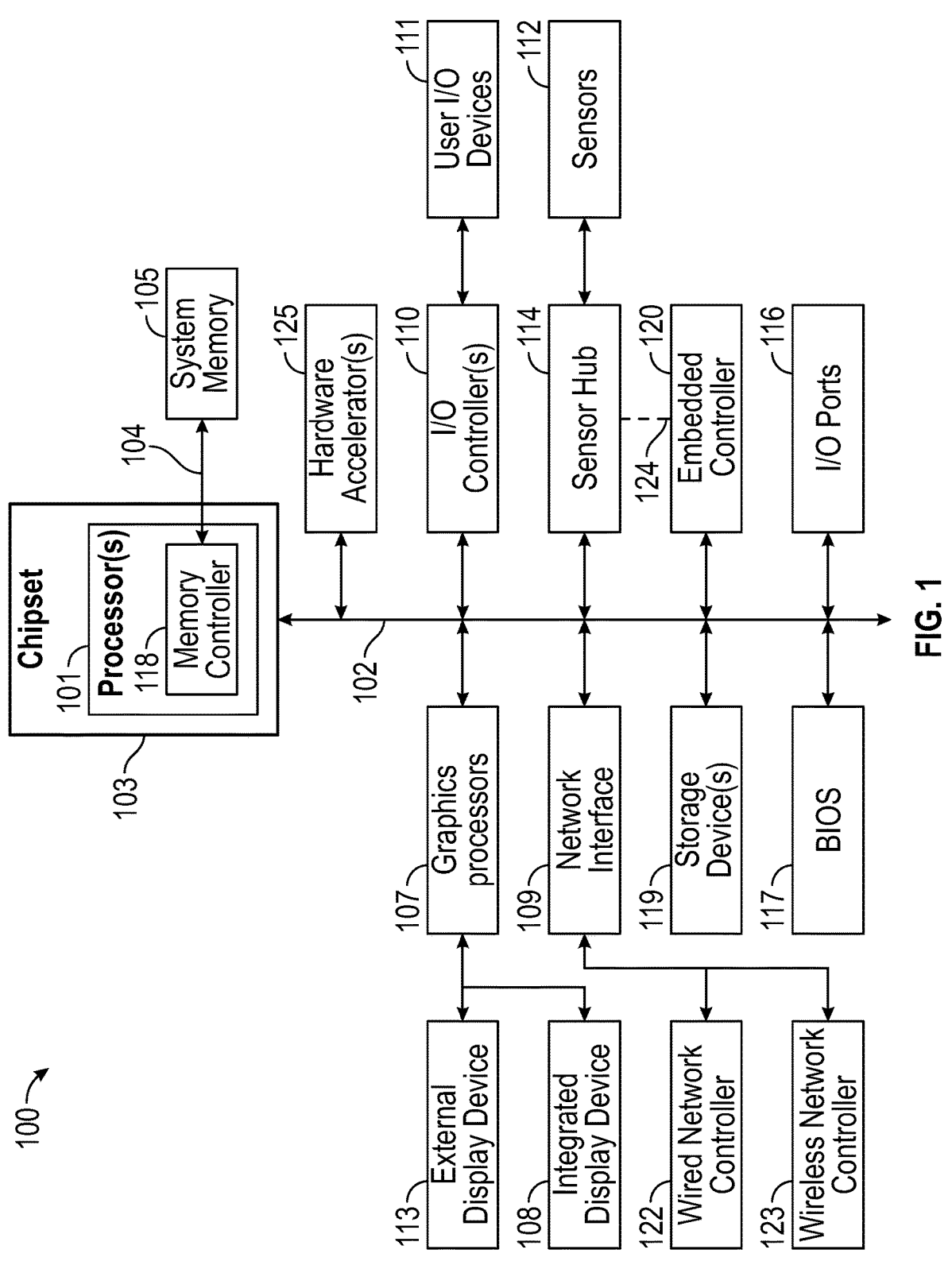
FIG. 1 is a block diagram of an example of hardware components of an Information Handling System (IHS) configured to support platform framework communications, according to some embodiments.

FIG. 1 is a block diagram illustrating components of IHS 100 configured to support platform framework communications according to some embodiments. As shown, IHS 100 includes one or more processor(s) 101, such as a Central Processing Unit (CPU), that execute code retrieved from system memory 105. Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102. In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
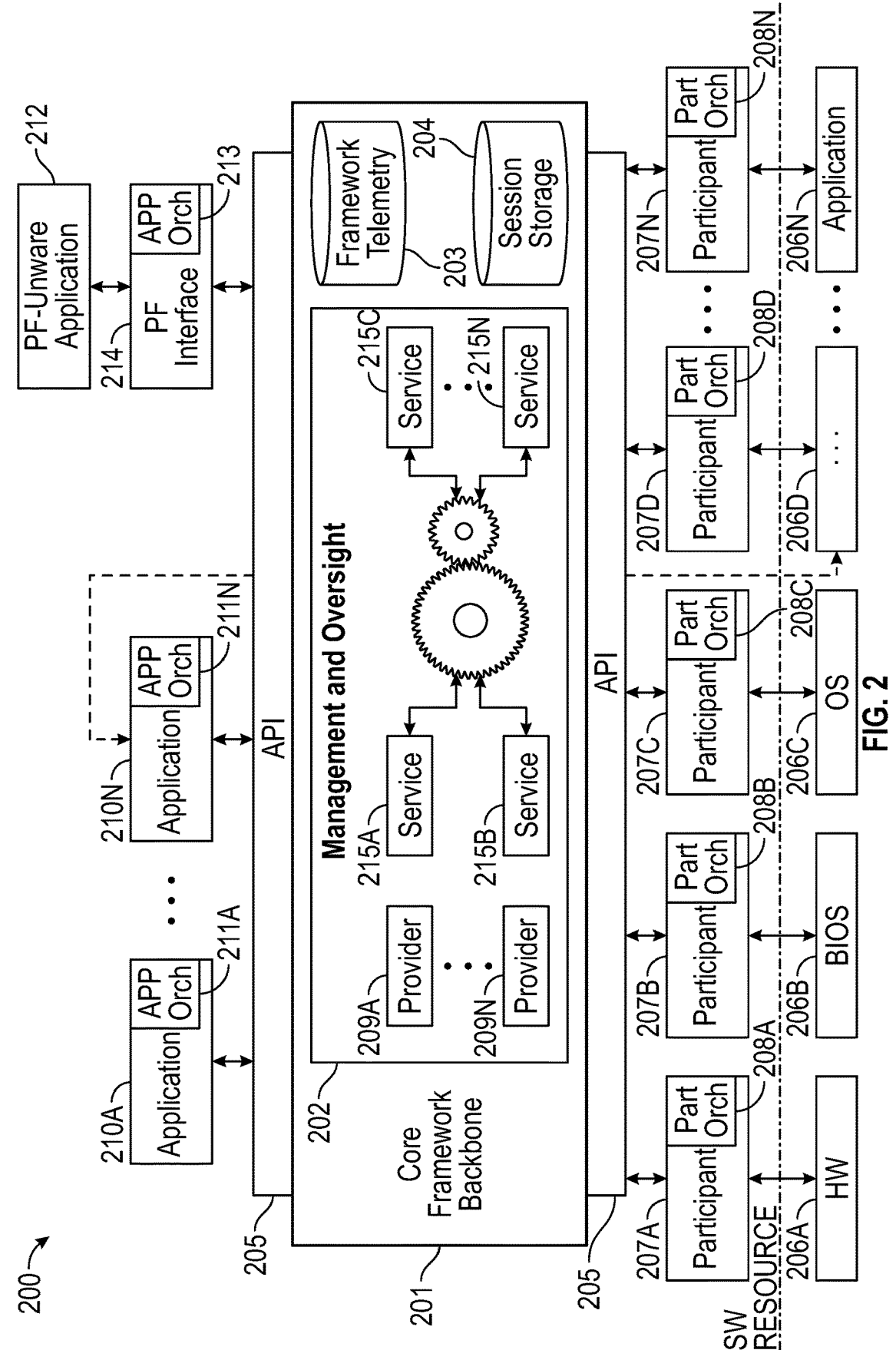
FIG. 2 is a block diagram illustrating an example of a platform framework deployed in an IHS in a manner that supports secure communications between framework participants, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.). In some implementations, platform framework 200 may be supported by and/or executed within an OS used by IHS 100, and it may be scaled across user and kernel spaces. Additionally, or alternatively, platform framework 200 may be provided as a software library or an ".exe" file. As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process. In some instances, the platform framework 200 may provide a handle received from a participant to other validated participants, thus supporting the ability for various types of participants to communicate directly with each other. For example, a handle provided to the platform framework 200 may include a reference to an IPC (Inter-Process Communications) resource of the IHS that is to be used in API communications supported by the participant providing the handle.

In various embodiments, platform framework 200 may include at least three different types of participants: producers, consumers, and providers. Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions. On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services. For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I2C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100. For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform networks may communicate with each other via an Interprocess Communication (IPC) resource specified in a handle provided by the workspace orchestration service for communications with the workspace(s) involved.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be complied, whereas the polic(ies) that the code enforces may change at runtime (e.g., by a user's command in real time) and therefore may be considered "runtime objects."

Figure 3:
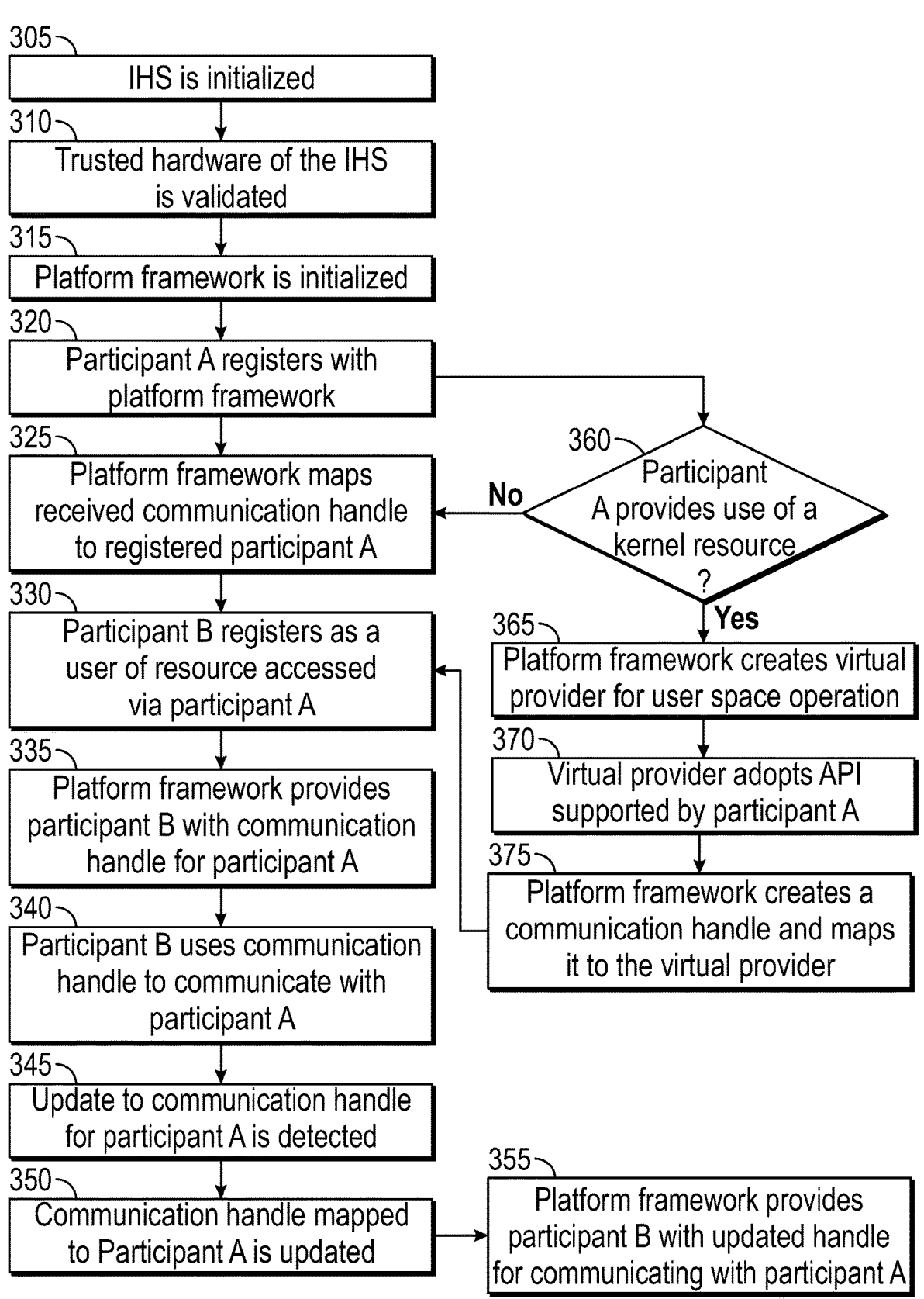
FIG. 3 is a flowchart illustrating an example of a method for supporting platform framework communications, according to some embodiments.

FIG. 3 is a flowchart illustrating an example of a method for supporting platform framework communications, according to some embodiments. Some embodiments may begin at block 305 with the initialization of an IHS, such as described with regard to FIG. 1. In some embodiments, procedures for initializing an IHS may include validation of various hardware components of the IHS, such as by the embedded controller of the IHS of FIG. 1. Accordingly, at block 310, the firmware instructions utilized by various hardware components may be validated against reference signatures for each respective component, thus confirming the hardware component is operating utilizing trusted instructions and is thus a trusted hardware component. Upon validating these hardware components such that they are included within a root of trust, an operating system of the IHS may be booted. With the operating system booted, at block 315, a platform framework for the IHS is initialized, where the platform framework provides a single interface for accessing various resources of the IHS, such as described with regard to FIG. 2.

Once the platform framework is initialized, it may be utilized by platform framework participants to access various resources of the IHS platform. For instance, various settings and status information may be obtained for a platform resource such as a camera of the IHS, where such camera information is made available to platform framework participants by a producer that has registered with the platform framework in providing access to camera resources. In some instances, the producer may also provide capabilities for operating a platform resource, such as the ability to operate the camera of the IHS to capture images and/or video. Accordingly, in various embodiments, participants can receive camera information and operate a camera through communications with a platform framework participant that interfaces with the camera. In other instances, a platform framework producer may similarly provide access to respective displays of an IHS, such as a producer that provides access to display settings of an internal display or a producer that provides access to display settings of one or more external monitors. Other platform framework participants may aggregate data from different producers in providing platform status determinations. For instance, a user presence detection provider may be accessible via the platform framework, where the provider makes user presence determinations based on data obtained from the platform framework from different producers, such as from one or more camera producers and from a producer that is a source of data from a line-of-sight sensor or from a motion sensor of the IHS. As described with regard to FIG. 2, platform framework embodiments provide capabilities by which participants may utilize such types of platform resources without having direct knowledge of the platform resource.

Figure 4:
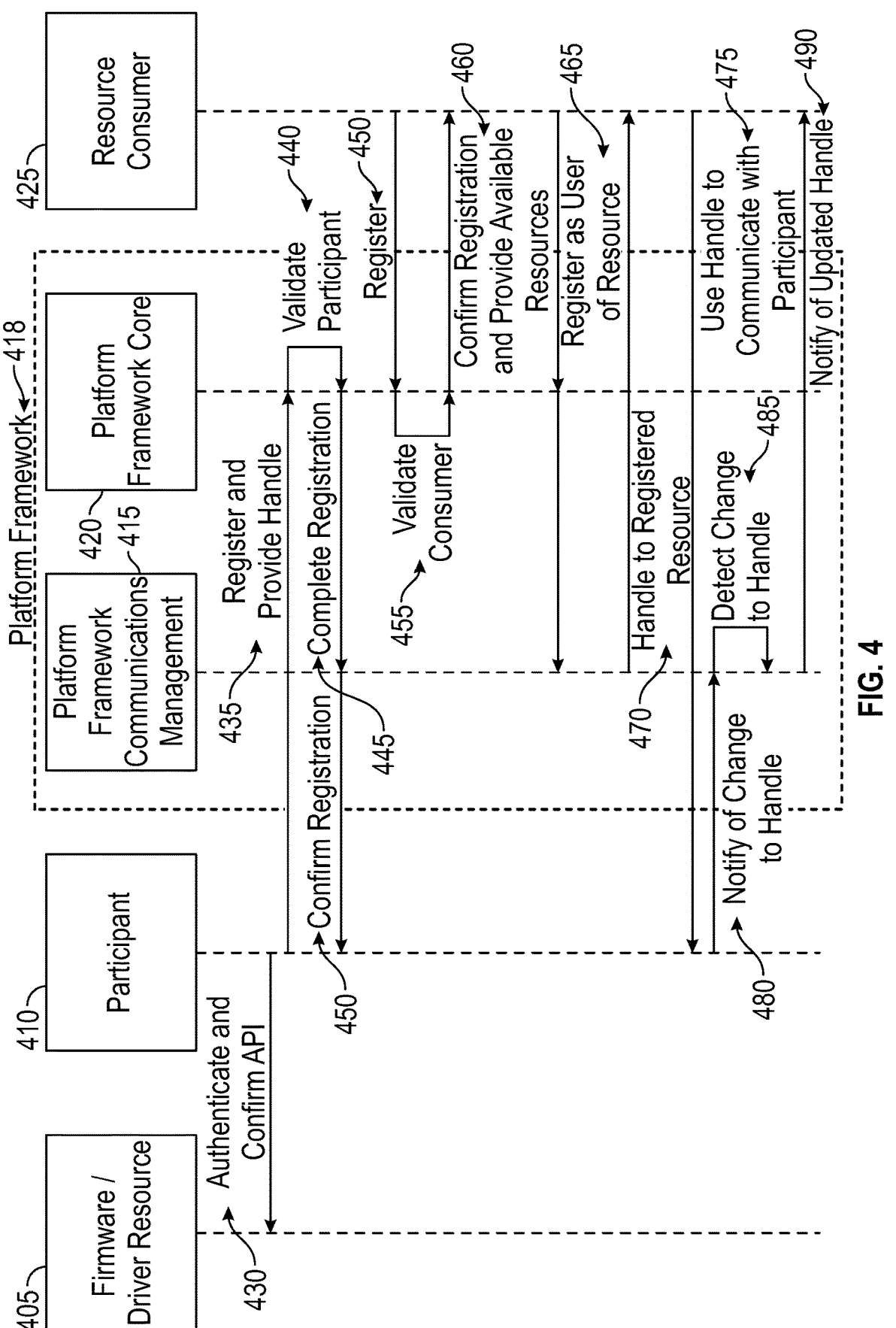
FIG. 4 is a message diagram illustrating certain operations of components of an IHS that are configured to support platform framework communications, according to some embodiments.

These various types of participants that provide access to a platform framework resource may make such resources available to other participants through the providing participant's registration with the platform framework. Such registrations by participants are illustrated in FIG. 4, which is a message diagram illustrating certain operations of components of an IHS that are configured to support platform framework communications, according to some embodiments. In some embodiments, a providing participant 410 may be initialized and may initiate communications with a platform framework resource 405, such as via an API supported by firmware or by a driver that is used to operate the resource. As indicated in FIG. 4, the providing participant 405 may authenticate the resource and may confirm the API that is supported by the firmware and/or driver.

As described above, hardware components of an IHS may be validated as authentic based on confirmation that instructions, such as firmware and/or drivers, utilized by the component are identical to a set of trusted reference instructions for the component, where such reference instructions may be provided during assembly of an IHS, or during a trusted administration of the IHS. In some embodiments, the participant 410 may validate the integrity of driver and/or firmware instructions utilized by a hardware resource 405 in such a manner. In some embodiments, the participant 410 may verify that the resource 405 operates using only instructions that have been verified as authentic against reference signatures provided by a trusted source, such as the embedded controller of the IHS of FIG. 1.

Upon validation of the instructions utilized by a platform resource 405, the participant 410 may also confirm the integrity of the API that is supported by the resource 405. For instance, a driver or firmware that is used to operate a hardware resource such as a camera, display, hardware accelerator, or presence detection sensors. In such instances, the integrity of the API provided for use by resource 405 may be confirmed by the participant 410 through calculation of a signature based on the API provided for use by the resource 405 against a reference signature provided to the participant 410. In other instances, the API supported by a resource 405 may be confirmed through initialization routines supported by the participant 410 that query the API of the resource in order to confirm that the operations that are supported by the resource 405 are those that are expected. In such instances, the queries by the participant 410 may also serve to confirm the operational status of the resource 405 and of each feature of the resource 405 that is supported by the API.

Once the instructions utilized by the hardware resource 405 have been validated by a participant 410, at block 320 of FIG. 3 and 435 of FIG. 4, the participant 410 registers with the platform framework 418. In some embodiments, such registrations may be supported by an API of the platform framework 420, such as described with regard to FIG. 2, where the API of the platform framework allows participants to register as a producers or provider that allows other participants to access a particular type of platform resource, and where the API of the platform framework allows participants to register as a consumer of platform framework resources. In some embodiments, the registration request issued by participant 410 identifies the resource 405 that it provides access to, where the resource may be hardware component of the IHS or may be a service that itself is implemented using one or more platform framework resources.

In some embodiments, at 440, upon receiving a registration request from a participant, the platform framework core 420 may validate the participant 410 that has issued the registration request. As described, the integrity of hardware components of an IHS may be validated based on confirmation that instructions, such as firmware or drivers, utilized by the component are identical to a set of trusted reference instructions for the component. In some embodiments, the platform framework core 420 may verify that drivers and/or firmware utilized by a hardware component 405 associated with a registering participant 410 has been validated in such a manner. In some embodiments, the platform framework core 420 may additionally or alternatively verify that the participant 410 operates using only instructions that have been verified as authentic against reference signatures provided by a trusted source, such as the embedded controller of the IHS of FIG. 1.

In support of such validation procedures that increase assurances that framework communications are between trusted participants, as indicated in FIG. 4, a registering participant 410 may include a token in its registration request that is submitted to the platform framework core 420, where this token corresponds to a signature for the firmware and/or driver instructions utilized by the hardware resource 405. In some embodiments, this token submitted by the participant 410 may be cryptographically signed by a trusted component of the IHS that has validated the integrity of the instructions corresponding to the token, such as the embedded controller of FIG. 1 that may validate the authenticity of instructions used by hardware components during pre-boot procedures of the IHS. Upon receiving a registration request, the platform framework core 420 may retrieve a public key corresponding to the trusted resource of the IHS, such as the embedded controller 120 of FIG. 1, in order to validate that the token was signed by this trusted resource, thus providing assurances that the embedded controller has validated the integrity of the firmware and/or driver instructions utilized by the platform framework resource 405 such that it is within the root of trust of an IHS. In some embodiments, the API of the resource 405 may be validated in this same manner. In some embodiments, the registration request with which the token was submitted may further specify whether the token corresponds only the underlying firmware and/or driver utilized by a platform resource 405, or whether additional software utilized by the participant 410 has also been accounted for in the token signature. For instance, a token submitted in a registration request may correspond to firmware and/or driver instructions of hardware components 405 utilized by a user presence detection participant 410, or a token may correspond to both the hardware and software instructions utilized by a user presence detection participant 410.

Based on confirmation that the token provided by the participant 410 has been provided by the trusted resource, the platform framework core 420 registers the participant 410 as providing use of the underlying platform resource 405. As indicated in FIG. 4, in some embodiments, the platform framework core 420 may rely on a communication management component 415 of the framework in order to manage communications with the registered participants 410. Accordingly, at 445 of FIG. 4 and at 325 of FIG. 3, the communications manager 415 may map the registered participant 410 to the handle provided in the participant's registration request. In some embodiments, the communications manger 415 may add the participant 410 to a manifest of registered participant, where the manifest identifies the platform framework resource 405 that is operated by the participant 410 and where the manifest further specifies the handle for communication with the participant 410 in order to operate features supported by the platform resource 405.

As described, the participant 410 may validate an API supported by the framework resource 405. In this same manner, the platform framework 418 may validate the API supported by the participant 410, where this API of the participant 410 may be identical, entirely different, or partially overlap in various manners with the API of the framework resource 405. In some embodiments, this API that is supported by the participant 410 may also be included in its registration request, or may be provided to the communication manager 415 in response to a confirmation of registration. The API provided by the participant 410 may be represented in the form of a structured file, such as a JSON or XML file, and may be mapped to the participant 410 along with the communication handle and any token provided by the participant 410. Once registration is completed, the communication manager 415 may issue a confirmation, at 450, of the successful registration. With the participant 410 registered within the manifest maintained by the platform framework communications manager 415, various operations of the IHS may continue, which may include the registration of various other participants with the platform framework.

As indicated at 450 of FIG. 4, these registrations may include a registration by a participant that is a resource consumer 425. As above, at 455, the platform framework may validate the authenticity of the consumer 425 using a token provided in the consumer's registration requests. At 460, the platform framework 418 provides the registered consumer 425 with a listing of available resources, such as resources 405 mapped to registered participants 410 in the manifest maintained by the communications manager 415 of the platform framework. At 465 of FIG. 4 and 330 of FIG. 3, the consumer 425 registers as a user of the resource 405 that is operated via the registered participant 410. At 335 of FIG. 3 and 470 of FIG. 4, the communications manager 415 provides the consumer 425 with the handle that is mapped to the participant 410.

As indicated at 475 of FIG. 4 and 340 of FIG. 3, once the communication handle has been provided by the platform framework 418, the consumer 425 may utilize the communication handle to communicate with participant 410 in use of the platform resource 405. As described above, the registration of participant 410 may include the API that is supported by the participant in providing use of features of the platform resource 405. In some embodiments, the API may specify notifications that are issued by the participant 410 and provides a mechanism by which other participants, such as consumer 425, may register as a subscriber to the supported notifications. For instance, in embodiments where the participant 410 is a provider of user presence detection capabilities that are implemented using one or more platform resources 405, such as time-of-flight sensors, cameras and motion sensors, the API mapped to the participant 410 may specify user presence and proximity notifications. For example, the API may specify notifications for determinations that a user has been detected within close proximity to the IHS, determinations that no individual is detected within a proximity to the IHS, determinations that multiple individuals are detected within proximity to the IHS, determinations that a particular user is detected within a proximity to the IHS, determinations of a distance from the IHS at which an individual has been detected, as well as other such proximity determinations.

As described above, an IHS may be a convertible laptop that may be configured in various different physical postures, such as converting from a traditional laptop posture to a kickstand posture, to a book posture, to a tablet posture and to a landscape posture. In such embodiments, a participant 410 may utilize a variety of hardware resources 405 in providing determinations regarding the current posture in which the IHS is physically configured. The API mapped to such a participant 410 may specify posture change notifications that are supported. In other embodiments, a participant 410 providing use of a camera 405 may be mapped to an API that provides notifications regarding changes to the status of a manual camera shutter, or notifications indicating the camera has been used to capture an image. A participant 410 providing location services may be mapped to an API that provides notifications of various types of location changes, such as notifications of a location change to a location at a particular building, or within range of a particular network, or within a specific vehicle, or in proximity to specify geographic location.

In some embodiments, the API that is mapped to a participant 410 may also specify features of resource 405 that may be operated. For instance, in embodiments where the participant 410 supports use of a camera resource 405, the API mapped to the participant may specify commands directing use of the camera to capture images and/or video. In this same manner, a participant 410 that supports use of a display resource 405 may be mapped to an API that specifies commands for initiating privacy capabilities of the displays, such dimming the output of the displays, blurring the output of the displays, or transitions the displays to low-power states with no outputs. A participant 410 may also support use of a processor core resource 405, such as the hardware accelerator described with regard to FIG. 1. In such embodiments, the API mapped to the participant 410 may support operations for offloading processing tasks to such a processor core resource 405.

In some embodiments, the API that is mapped to a participant may specify methods for notifying the participant 410 of changes to policies that will affect the operation of the platform resource 405. For instance, the API of a participant 410 providing use of a camera resource 405 may provide a mechanism for notifying the participant 410 of changes to a user privacy policy, where such privacy policy changes may trigger participant's 410 disabling of the camera 405, or closing a privacy shutter that prevents use of the camera. In embodiments where the IHS is a convertible laptop, the API of the participant 410 providing use of a camera resource 405 may also provide a mechanism for notifying the participant of a change to a posture policy, where posture policy changes may trigger the participant 410 in disabling the camera resource 405 while the IHS is physically configured in certain postures where the camera is oriented in a non-usable position. In a similar manner, the API mapped to a participant 410 providing use of a display resource 405 may provide a mechanism for notifying the participant of changes to a power policy, where power policy changes may trigger the participant 410 transitioning the display resource 405 to a low-power mode.

The consumer 425 may utilize a provided handle in invoking such APIs supported by a participant 410 that provides use of a platform resource 405. Through the use of these APIs supported by the handle provided by participant 410, the consumer 425 may utilize the platform resource 405 without direct knowledge of the underlying hardware in use by the resource. In this manner, the platform framework 418 may support multiple different consumers 425 utilizing a single platform resource 405 simultaneously. However, in some scenarios, the handle supported by a participant 410 may change during operation of the IHS. For instance, in embodiments where the handle is an IPC (Inter-process Communication) resource such as a file location, this IPC file location may become unavailable, such as due to a failure or swapping of a hard drive or a memory module. In embodiments where the IPC handle is a socket or a pipe, these resources may become unavailable due to resource contention, or due to updates to a network interface supporting a socket or to the operating system supporting the pipe. In other instances, a handle supported by a participant 410 may change due to changes to the APIs that are supported by the handle. For example, an API of a participant 410 providing use of a display resource 405 may be modified in order to support newly configured contextual power modes. In another example, an API providing access to operations by a user presence detection participant 410 may be modified to support additional proximity notifications, such as notifications that provide an estimated distance of a detected individual from the IHS, where the updated notifications are augmented with a reported confidence level in the determination that an individual is present. In instances where a communication handle utilized by a participant 410 becomes unavailable, or the API supported by the handle is modified, at 345 of FIG. 3, the updated handle is determined.

As indicated at 480 of FIG. 4, such changes to a communication handle that is supported by a participant 410 may be reported by the participant to the communications manager 415 of the platform framework 418. In addition to receiving reports of changes to the handle from the participant 410, in some embodiments, at 485, the communications manager may detect changes to the handle that is mapped to the participant 410. In some embodiments, the communications manager 415 may determine a handle mapped to a participant 410 is no longer valid based on the detection of error messages reported to the platform framework 418, error messages that are reported by a consumer 425 that is attempting to utilize the handle.

As described with regard to FIG. 1, IHSs may support containerized workspaces that provide computing environments that may operate in varying degrees of isolation from the underlying hardware of the IHS and from other workspaces. As described, the operation of such workspaces may be specified within a workspace definition that may be provided by a remote orchestration layer, where the workspace definition identifies the security restrictions and productivity tools for a particular workspace based on the security and productivity contexts of the hardware and software of an IHS, the user, the physical environment, the data being accessing, etc. In some embodiments, a workspace definition may specify the platform framework resources that a workspace will rely upon, such as specifying that the workspace relies on user presence detection capabilities of the platform framework. Accordingly, in some embodiments, a workspace may register with the platform framework 418 as participant that is consumer 425. In such embodiments, a workspace definition corresponding to a workspace that is a framework consumer 425 may specify the registration of the workspace as a user of platform capabilities provided by a participant 410, such as a user of a participant providing user presence detection capabilities, or a participant providing network information. Additionally, in some embodiments, the workspace definition corresponding to a workspace that registers as a framework participant may also specify a handle for communicating with the workspace, where the handle may preserve the isolation of the workspace. Configured in this manner, a workspace is able to utilize a platform resource 405 via the participant 410, while maintaining the isolation of the workspace from the underlying hardware of an IHS.

In various embodiments, a workspace may operate locally on an IHS, or that same workspace may operate in full or in part remotely from the IHS, such as on a cloud resource. In some instances, a workspace may transition from operating locally to operating remotely in response to changes in the security context of the IHS, such as the disabling of antivirus or other security software of the IHS. In such instances, the transition of a workspace between local and remote execution may result in the handle in use by the workspace no longer being valid. For example, a handle that specifies a local socket for communicating with a workspace may become non-functional if the workspace is migrated to remote execution on a cloud resource. In such instances, the updated workspace definition for the operation of the remote workspace may specify an updated communication handle for communicating with the workspace. The workspace may then report the updated handle to the communications manager 415 of the platform framework 418.

In response to detecting a change to a handle or receiving a report of a change to a handle, an updated handle for communicating with the participant 410 is determined and, at 350, the updated handle is mapped to the participant 410. As indicated at 355 of FIG. 3 and at 490 of FIG. 4, the updated handle for communicating with the participant 410 may then be reported to the consumer 425, thus supporting ongoing use of the resource 405 by the consumer 425 using this updated handle. In this manner, embodiments provide capabilities by which secure communication with framework participants 410 may be maintained despite changes to the communication mechanisms that are utilized by the participant and without requiring the participant 410 to manage the notifications required for other participants, such as consumer 425, to be apprised of these changes.

Through the distribution of communication handles by a communications manager 415 of the platform framework 418, embodiments provide support for secure communications between framework participants. However, as illustrated in FIG. 3, in some embodiments, certain participants may be protected from being accessed directly by consumers, thus providing additional protection to certain platform resources. For instance, upon a participant 410 registering with the platform framework 418 as providing use of a platform resource 405, at 360 of FIG. 3, the platform framework may assess whether the platform resource 405 is a kernel resource, thus affording the participant 410 additional protection. For example, a kernel-space resource such as the hardware accelerator, network controller, embedded controller, storage devices, memory and graphics controller of FIG. 1 may be advantageously segregated from other resources, that may be referred to as user-space resources, such as time-of-flight sensors and motion sensors that do not provide the same types of opportunities for malicious actors to access core capabilities of an IHS.

Accordingly, in scenarios where the resource 405 accessed by a registering participant 410 is determined to be kernel resource, at 365, the platform framework generates a virtual provider that provides user-space access to some or all of the capabilities of the kernel resource. In providing use of the kernel resource, at 370, the virtual provider may adopt all or part of the APIs that would otherwise be mapped to the participant 410 and made available to consumers 425 along with the communication handle provided by the participant. In some embodiments, the API adopted by the virtual provider may include notifications and queries supported by the participant 410, but may omit API support for invoking other types of operations by resource 405 that are supported via the participant. For instance, a participant 410 providing use of a hardware accelerator resource 405 may be protected by the virtual provider adopting the APIs of the participant 410 that support task offloading notifications and status queries, but do not include APIs that allow computing tasks to be delegated for processing by the accelerator. In this same manner, a virtual provider that is instantiated for providing access to a storage device that has been designated as storing protected data may adopt the APIs of the participant 410 that support read operations, or that limit the virtual provider in only supporting capacity and status queries, while omitting from the API any support for reading or writing to the storage device.

In some embodiments, the platform framework may generate such virtual providers for all kernel resources, while other embodiments may generate virtual providers only for use by consumers 425 that have not been validated as utilizing authentic instructions, such as described above. Once the virtual provider has been configured, at 375, the platform framework 418 generates a handle for communicating with the virtual provider. As indicated in FIG. 3, this handle is then mapped to the virtual provider and distributed for use by consumers 425 in operation of the portion of the participant 410 API that has been adopted by the virtual provider.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a plurality of hardware devices, each configured to be operated by one or more participants of a platform framework;
   a processor; and
   a memory coupled to the processor, the memory configured with program instructions stored thereon that, upon execution, cause the platform framework of the IHS to:
      register a first of the one or more participants as configured to provide operation of a first of the plurality of hardware devices, wherein registration comprises specification of a handle that comprises a reference to an Inter-process Communication (IPC)

resource of the IHS, for communication with the first participant in order to operate the first hardware device, wherein the handle is validated at least in part by Root-of-Trust hardware, wherein registration further comprises a specification of an API supported by the first participant, and wherein the API is represented as a structured file comprising JSON or XML;

provide the handle for communication with the first participant in operation of the first hardware device to a second of the one or more participants of the platform framework;

determine an update to the handle for communication with the first participant in operation of the first hardware device, wherein the first participant comprises a containerized workspace and wherein the update to the handle is determined in response to an error associated with the handle, at least in part as a result of migration of the containerized workspace from operation on the IHS to operation on a remote resource; and notify the second participant of the updated handle for communication with the first participant in operation of the first hardware device, wherein the executed instructions further cause the platform framework to determine whether the operation of the first hardware device by the first participant is in correspondence to operation of a kernel resource, generate a virtual platform framework participant configured to provide user-space access to capabilities of the kernel resource and configured to interface with the first participant in provision of operation of the kernel resource upon determination that operation of the first hardware device is in correspondence to operation of the kernel resource, generate a handle for communication with the virtual platform framework participant, and provide the second participant with the handle to the virtual platform framework participant instead of the handle for communication with the first participant.

2. The IHS of claim 1, wherein the first participant is configured to provide operation of the first hardware device by interface with at least one of a driver or firmware to operate the first hardware device.

3. The IHS of claim 2, wherein the handle is provided along with a token configured to correspond to a signature of the at least one of the driver and firmware to operate the first hardware device, and wherein the registration further comprises a specification of whether the token is configured to correspond only to the at least one of the driver and firmware used to operate the first hardware device or is also configured to correspond to additional software utilized by the first participant.

4. The IHS of claim 3, wherein, upon provision of the handle to the second participant, the second participant is configured to authenticate the token as signed by a trusted resource of the IHS.

5. The IHS of claim 4, wherein the trusted resource of the IHS is configured to sign the token upon validation that a signature calculated based on instructions by the at least one of the driver and firmware is determined to match the signature of the token.

6. The IHS of claim 1, wherein the update to the handle is determined in response to a plurality of errors detected by the platform framework.

7. The IHS of claim 1, wherein the handle supports an API (Application Programming Interface) configured to specify notifications that are generated by the first hardware device, and wherein the structured file is mapped to the first participant along with the communication handle and any token provided by the first participant.

8. The IHS of claim 7, wherein the API supported by the handle is further configured to specify operations of the first hardware device that are supported by the first participant.

9. The IHS of claim 7, wherein the notifications specified by the API supported by the handle comprise user presence detection notifications.

10. The IHS of claim 7, wherein the notifications specified by the API supported by the handle comprise notifications of a change in a physical posture of the IHS, and wherein the change in the physical posture comprises a transition among at least two of: a table posture, a display posture, a laptop posture, a stand posture, or a tent posture.

11. The IHS of claim 8, wherein the operations specified by the API supported by the handle comprise operations configured to capture images via a camera of the IHS.

12. The IHS of claim 7, wherein the API supported by the handle is further configured to specify operations configured to notify the first participant of policy changes related to the first hardware device.

13. The IHS of claim 12, wherein the first hardware device comprises a display of the IHS, and wherein the policy changes comprise changes to a display policy for initiation of privacy capabilities supported by the display, and wherein the privacy capabilities comprise at least one of: dim an output of the display, blur the output of the display, or transition the display to a low-power state with no output.

14. A memory storage device configured with program instructions stored thereon that, upon execution by an Information Handling System (IHS) comprising a plurality of hardware devices, each configured to be operated by one or more participants of a platform framework, cause the IHS to:

register a first of the one or more participants as configured to provide operation of a first of the plurality of hardware devices, wherein registration comprises specification of a handle that comprises a reference to an Inter-process Communication (IPC) resource of the IHS, for communication with the first participant in order to operate the first hardware device, wherein the handle is validated at least in part by Root-of-Trust hardware, wherein registration further comprises a specification of an API supported by the first participant, wherein the API is represented as a structured file comprising JSON or XML mapped to the first participant along with the communication handle and any token provided by the first participant, wherein the first participant is configured to provide operation of the first hardware device by interface with at least one of a driver and firmware to operate the first hardware device, and wherein the registration further comprises a specification of whether the token is configured to correspond only to the at least one of the driver and firmware used to operate the first hardware device or is also configured to correspond to additional software utilized by the first participant;

provide the handle for communication with the first participant in operation of the first hardware device to a second of the one or more participants of the platform framework;

determine an update to the handle for communication with the first participant in operation of the first hardware device, wherein the first participant comprises a containerized workspace and wherein the update to the handle is determined in response to an error associated with the handle, at least in part as a result of migration of the containerized workspace from operation on the IHS to operation on a remote resource; and notify the second participant of the updated handle for communication with the first participant in operation of the first hardware device, wherein notify comprises a user presence detection notification and a notification of a change in a physical posture of the IHS, and wherein the change in the physical posture comprises a transition among at least two of: a table posture, a display posture, a laptop posture, a stand posture, or a tent posture, wherein the executed instructions further cause the platform framework to determine whether the operation of the first hardware device by the first participant is in correspondence to operation of a kernel resource, generate a virtual platform framework participant configured to provide user-space access to capabilities of the kernel resource and configured to interface with the first participant in provision of operation of the kernel resource upon determination that operation of the first hardware device is in correspondence to operation of the kernel resource, generate a handle for communication with the virtual platform framework participant, and provide the second participant with the handle to the virtual platform framework participant instead of the handle for communication with the first participant.

15. A method, comprising:

registering one or more participants of a platform framework as providing operation of a plurality of hardware devices of an Information Handling System (IHS);

registering a first of the one or more participants as providing operation of a first of the plurality of hardware devices, wherein registration specifies a handle that comprises a reference to an Inter-process Communication (IPC) resource of the IHS, for communicating with the first participant in order to operate the first hardware device, wherein the handle is validated at least in part by Root-of-Trust hardware, wherein registration further specifies an API supported by the first participant, the API being represented as a structured file comprising JSON or XML mapped to the first participant along with the communication handle and any token provided by the first participant, wherein the first participant is configured to provide operation of the first hardware device by interface with at least one of a driver and firmware to operate the first hardware device, wherein the registration further comprises a specification of whether the token is configured to correspond only to the at least one of the driver and firmware used to operate the first hardware device or is also configured to correspond to additional software utilized by the first participant, wherein the API is configured to specify notifying the first participant of policy changes related to the first hardware device, wherein the first hardware device comprises a display of the IHS, wherein the policy changes comprise changes to a display policy for initiation of privacy capabilities supported by the display, and wherein the privacy capabilities comprise at least one of: dim an output of the display, blur the output of the display, or transition the display to a low-power state with no output;

providing the handle for communicating with the first participant in operation of the first hardware device to a second of the one or more participants of the platform framework;

determining an update to the handle used for communicating with the first participant in operation of the first hardware device, wherein the first participant comprises a containerized workspace and wherein the update to the handle is determined in response to an error associated with the handle, at least in part as a result of migration of the containerized workspace from operation on the IHS to operation on a remote resource; and notifying the second participant of the updated handle for communicating with the first participant in operation of the first hardware device, wherein the method further comprises: determining whether the operation of the first hardware device corresponds to operation of a kernel resource, generating a virtual platform framework participant that provides user-space access to capabilities of the kernel resource and interfaces with the first participant in provision of operation of the kernel resource in response to determining that the operation of the first hardware device corresponds to operation of the kernel resource, generating a handle for communication with the virtual platform framework participant, and providing the second participant with the handle to the virtual platform framework participant instead of the handle for communication with the first participant.

* * * * *